(12) United States Patent
Deur-Bert et al.

(10) Patent No.: US 10,023,779 B2
(45) Date of Patent: Jul. 17, 2018

(54) COMPOSITION CONTAINING 1,1,-DIFLUOROETHANE AND 3,3,3-TRIFLUOROPROPENE

(71) Applicant: ARKEMA FRANCE, Colombes (FR)

(72) Inventors: Dominique Deur-Bert, Charly (FR); Laurent Wendlinger, Soucieu en Jarrest (FR)

(73) Assignee: ARKEMA FRANCE, Colombes (FR)

( * ) Notice: Subject to any disclaimer, the term of this patent is extended or adjusted under 35 U.S.C. 154(b) by 5 days.

(21) Appl. No.: 15/367,845

(22) Filed: Dec. 2, 2016

(65) Prior Publication Data

US 2017/0081577 A1 Mar. 23, 2017

Related U.S. Application Data

(62) Division of application No. 14/655,468, filed as application No. PCT/FR2013/052971 on Dec. 6, 2013, now Pat. No. 9,663,692.

(30) Foreign Application Priority Data

Dec. 26, 2012 (FR) ...................... 12 62764

(51) Int. Cl.
| | |
|---|---|
| *C09K 5/04* | (2006.01) |
| *C09K 3/00* | (2006.01) |
| *H01B 3/56* | (2006.01) |
| *C09K 3/30* | (2006.01) |
| *C08J 9/14* | (2006.01) |
| *C09F 9/00* | (2006.01) |

(52) U.S. Cl.
CPC ................ *C09K 3/00* (2013.01); *C08J 9/146* (2013.01); *C09F 9/00* (2013.01); *C09K 3/30* (2013.01); *C09K 5/045* (2013.01); *H01B 3/56* (2013.01); *C08J 2203/142* (2013.01); *C08J 2203/162* (2013.01); *C08J 2203/182* (2013.01); *C09K 2205/122* (2013.01); *C09K 2205/126* (2013.01); *C09K 2205/13* (2013.01); *C09K 2205/22* (2013.01); *C09K 2205/32* (2013.01)

(58) Field of Classification Search
CPC .......... C09K 5/04; C09K 5/044; C09K 5/045; C09K 2205/126; C09K 2205/22; C09K 2205/32

See application file for complete search history.

(56) References Cited

U.S. PATENT DOCUMENTS

| | | | |
|---|---|---|---|
| 9,663,692 B2 * | 5/2017 | Deur-Bert | ................ C09K 3/30 |
| 2006/0243945 A1 | 11/2006 | Minor et al. | |
| 2010/0237279 A1 | 9/2010 | Hulse et al. | |
| 2013/0055733 A1 | 3/2013 | Rached | |

FOREIGN PATENT DOCUMENTS

| | | |
|---|---|---|
| WO | WO 2009/047535 A2 | 4/2009 |
| WO | WO 2009/105517 A2 | 8/2009 |
| WO | WO 2011/141654 A2 | 11/2011 |

OTHER PUBLICATIONS

International Search Report (PCT/ISA/210) dated Mar. 12, 2014, by the French Patent Office as the International Searching Authority for International Application No. PCT/FR2013/052971.

* cited by examiner

*Primary Examiner* — John R Hardee

(74) *Attorney, Agent, or Firm* — Buchanan Ingersoll & Rooney P.C.

(57) ABSTRACT

Compositions containing 1,1-difluoroethane and 3,3,3-trifluoropropene, that can be used in multiple fields of application. The composition may include from 25 to 65 mol % of 1,1-difluoroethane and from 75 to 35 mol % of 3,3,3-trifluoropropene at a temperature of between −25° C. and 25° C. and a pressure of between 1 and 6 bar. The composition may further include hydrogen fluoride. The composition may include from 20 to 55 mol % of HF, 30 to 40 mol % of 1,1-difluoroethane and 30 to 40 mol % of 3,3,3-trifluoropropene.

8 Claims, No Drawings

COMPOSITION CONTAINING 1,1,-DIFLUOROETHANE AND 3,3,3-TRIFLUOROPROPENE

CROSS REFERENCE TO RELATED APPLICATIONS

The present application is a divisional of U.S. application Ser. No. 14/655,468 filed on Jun. 25, 2015, now U.S. Pat. No. 9,663,692 which is a U.S. National Stage of International Application No. PCT/FR2013/052971, filed on Dec. 6, 2013, which claims the benefit of French Application No. 12.62764, filed on Dec. 26, 2012. The entire contents of each of U.S. application Ser. No. 14/655,468, International Application No. PCT/FR2013/052971, and French Application No. 12.62764 are hereby incorporated herein by reference in their entirety.

TECHNICAL FIELD

The present invention relates to compositions comprising 1,1-difluoroethane and 3,3,3-trifluoropropene that are useful in many fields of application.

BACKGROUND

Fluids based on halocarbons have thus found many applications in various industrial fields, in particular as heat transfer fluid, propellants, foaming agents, blowing agents, gaseous dielectrics, monomer or polymerization medium, support fluids, agents for abrasives, drying agents and fluids for energy production units.

Particular importance is given to fluids that have a low impact on the environment.

The advantage of using azeotropic or quasi-azeotropic fluids is that they do not fractionate, during evaporation processes and act (almost) as a pure body. However, it is difficult to identify novel fluids that meet these characteristics, since azeotropes cannot be predicted.

DETAILED DESCRIPTION

The subject of the present invention is an azeotropic or quasi-azeotropic composition comprising the compounds 1,1-difluoroethane and 3,3,3-trifluoropropene.

In what follows, the following compounds represent:
1,1-difluoroethane: HFC-152a or 152a
3,3,3-trifluoropropene: HFO-1243zf or 1243zf The expression "quasi-azeotropic" has a broad meaning and is intended to include the compositions that are strictly azeotropic and those that behave as an azeotropic mixture.

A mixture is azeotropic when the pressure at the dew point is equal to that at the bubble point, which means that the vapor composition is equal to that of the condensed liquid.

A mixture is considered to be quasi-azeotropic when the pressure difference between the pressure at the dew point and the pressure at the bubble point is less than or equal to 5%, on the basis of the pressure at the bubble point.

According to one embodiment, the composition according to the invention comprises, preferably essentially consisting of, from 10 to 80 mol % of 1,1-difluoroethane and from 90 to 20 mol % of 3,3,3-trifluoropropene.

According to one embodiment, the composition according to the invention comprises, preferably essentially consisting of, from 20 to 70 mol % of 1,1-difluoroethane and from 80 to 30 mol % of 3,3,3-trifluoropropene.

According to one particularly preferred embodiment, the composition according to the invention comprises, preferably essentially consisting off from 25 to 65 mol % of 1,1-difluoroethane and from 75 to 35 mol % of 3,3,3-trifluoropropene and has a boiling point between −25° C. and 25° C. at a pressure of between 1 and 6 bar.

According to another embodiment, the composition according to the invention also comprises hydrogen fluoride.

According to one embodiment, the composition according to the invention comprises, preferably essentially consisting of, from 20 to 55 mol % of HF, 30 to 40 mol % of 1,1-difluoroethane and 30 to 40 mol % of 3,3,3-trifluoropropene.

The invention also relates to the use of a fluid comprising the composition according to the invention as heat transfer fluid, propellants, foaming agents, blowing agents, gaseous dielectrics, monomer or polymerization medium, support fluids, agents for abrasives, drying agents and fluids for energy production units.

Preferably, the invention relates to the use of a fluid comprising the composition according to the invention as heat transfer fluid in a heat pump or refrigeration plant.

The invention also relates to a heat transfer plant comprising a vapor compression circuit containing a fluid comprising a composition according to the invention as heat transfer fluid or containing a heat transfer fluid as described above.

According to one embodiment, the plant is selected from mobile or stationary plants for heating via a heat pump, for air conditioning, and in particular for motor vehicle air conditioning or for centralized stationary air conditioning, for refrigeration or for freezing and Rankine cycles; and which is preferably an air conditioning plant.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, in which the heat transfer fluid is a fluid comprising a composition according to the invention.

The expression "heat transfer fluid" is understood to mean a fluid capable of absorbing heat by evaporating at low temperature and low pressure and of releasing heat by condensing at high temperature and high pressure, in a vapor compression circuit.

A heat transfer fluid optionally comprises one or more additives which are not heat transfer compounds for the envisaged application. The additives may in particular be selected from lubricants, nanoparticles stabilizers, surfactants, tracers, fluorescent agents, odorous agents and solubilizing agents, as are well known to a person skilled in the art.

TABLE 1

| | Pressure: 1 bar absolute | | | Pressure 3 bar absolute | | |
|---|---|---|---|---|---|---|
| Azeotrope | Temperature (° C.) | Mole (%) of 152a | Mole (%) of 1243zf | Temperature ° C. | Mole (%) of 152a | Mole (%) of 1243zf |
| 152a/1243zf | −25 | 29 | 71 | 3 | 60 | 40 |

EMBODIMENTS

1. An azeotropic or quasi-azeotropic composition comprising the compounds 1,1-difluoroethane and 3,3,3-trifluoropropene.

2. The composition as in embodiment 1, characterized in that it comprises, preferably essentially consisting of from 10 to 80 mol % of 1,1-difluoroethane and from 90 to 20 mol % of 3,3,3-trifluoropropene.

3. The composition as in embodiment 1 or embodiment 2, characterized in that it comprises, preferably essentially consisting of, from 20 to 70 mol % of 1,1-difluoroethane and from 80 to 30 mol % of 3,3,3-trifluoropropene.

4. The composition as in any one of the preceding embodiments, characterized in that it comprises, preferably essentially consisting of, from 25 to 65 mol % of 1,1-difluoroethane and from 75 to 35 mol % of 3,3,3-trifluoropropene at a temperature of between −25° C. and 25° C. and a pressure of between 1 and 6 bar.

5. The composition as in any one of the preceding embodiments, characterized in that it comprises at least hydrogen fluoride.

6. The composition as in any one of the preceding embodiments, characterized in that it comprises, preferably essentially consisting of from 20 to 55 mol % of HF, 30 to 40 mol % of 1,1-difluoroethane and 30 to 40 mol % of 3,3,3-trifluoropropene.

The invention claimed is:

1. An azeotropic or quasi-azeotropic composition comprising:
   1,1-difluoroethane;
   3,3,3-trifluoropropene; and
   hydrogen fluoride.

2. The composition as claimed in claim 1, wherein the composition comprises:
   from 20 to 40 mol % of HF,
   from 30 to 40 mol % of 1,1-difluoroethane, and
   from 30 to 40 mol % of 3,3,3-trifluoropropene.

3. The composition as claimed in claim 1, wherein the composition consists essentially of:
   from 20 to 40 mol % of hydrogen fluoride;
   from 30 to 40 mol % of 1,1-difluoroethane; and
   from 30 to 40 mol % of 3,3,3-trifluoropropene.

4. The composition as claimed in claim 1, wherein the composition consists of:
   from 20 to 40 mol % of hydrogen fluoride;
   from 30 to 40 mol % of 1,1-difluoroethane; and
   from 30 to 40 mol % of 3,3,3-trifluoropropene.

5. A heat transfer fluid comprising the composition as claimed in claim 1.

6. The heat transfer fluid of claim 5, further comprising at least one additive selected from lubricants, nanoparticles, stabilizers, surfactants, tracers, fluorescent agents, odorous agents and solubilizing agents.

7. An azeotropic or quasi-azeotropic composition consisting essentially of:
   hydrogen fluoride;
   1,1-difluoroethane; and
   3,3,3-trifluoropropene.

8. An azeotropic or quasi-azeotropic composition consisting of:
   hydrogen fluoride;
   1,1-difluoroethane; and
   3,3,3-trifluoropropene.

* * * * *